United States Patent [19]

Eisenbach et al.

[11] Patent Number: 5,239,024

[45] Date of Patent: Aug. 24, 1993

[54] PROCESS FOR THE PREPARATION OF ALTERNATING COPOLYMERS PERPARED FROM UNSATURATED POLAR COMPOUNDS AND OLEFINS

[75] Inventors: Claus D. Eisenbach, Bayreuth; Ulrich Bülow, Burghausen; Wolfgang Lieberth, Bayreuth; Hartmut Fischer, Hofheim am Taunus, all of Fed. Rep. of Germany

[73] Assignee: Hoechst Aktiengesellschaft, Frankfurt am Main, Fed. Rep. of Germany

[21] Appl. No.: 604,616

[22] Filed: Oct. 26, 1990

[30] Foreign Application Priority Data

Oct. 28, 1989 [DE] Fed. Rep. of Germany ....... 3935978

[51] Int. Cl.$^5$ .................. C08F 4/10; C08F 220/44
[52] U.S. Cl. .................... 526/209; 526/192; 526/221; 526/230; 526/230.5; 526/232.1; 526/235; 526/342; 526/237
[58] Field of Search ............... 526/192, 221, 342, 209, 526/230, 230.5, 232.1, 235, 237

[56] References Cited

U.S. PATENT DOCUMENTS

| | | | |
|---|---|---|---|
| 2,464,062 | 3/1949 | Strain | 526/230.5 X |
| 3,183,217 | 5/1965 | Serniuk et al. | 526/221 |
| 3,814,734 | 6/1974 | Kawasumi et al. | 526/221 X |
| 3,864,319 | 2/1975 | Gaylord | 526/237 |

OTHER PUBLICATIONS

Ikegami et al., "Polymerization of Coordinated Monomers . . . ", J. Poly. Sci., Pt. A-1, 8, 195 (1970).
Gaylord, "Donor-Acceptor Cômplexes In Copolymerization . . . ", Poly, Preprints, 11, 27 (1970).
Gaylord et al., "Preparation of Alternating Copolymers in the Presence of Metal Halides . . . ", Polym. Letters 9, 97-102 (1971).

Primary Examiner—Fred Teskin
Attorney, Agent, or Firm—Curtis, Morris & Safford

[57] ABSTRACT

The invention relates to a process for the preparation of alternating copolymers from unsaturated polar compounds and olefins in the presence of complexing agents, in which the complexing agent comprising the primarily formed copolymer/metal compound complex can be recovered in a simple manner and in reusable form.

The copolymerization is carried out in the presence of salts, such as nitrates, but preferably halides, of divalent metal ions as the complexing agent in organic solvents at pressures of up to about 100 bar and at temperatures between $-78°$ C. and $100°$ C. with the use of free-radical initiators.

The reaction product is a mixture of the copolymer of a strictly alternating structure of unsaturated polar compounds and olefin, and of a copolymer which is higher in the unsaturated polar compound. The alternating copolymer can be easily separated therefrom by extraction with solvents, such as trichloromethane or acetone.

12 Claims, No Drawings

PROCESS FOR THE PREPARATION OF ALTERNATING COPOLYMERS PERPARED FROM UNSATURATED POLAR COMPOUNDS AND OLEFINS

DESCRIPTION

The invention relates to a process for the preparation of alternating copolymers from unsaturated polar compounds and olefins in the presence of complexing agents.

The preparation of alternating copolymers by polymerization of α-olefins, such as ethylene (ET), propylene (PR), isoprene, with unsaturated polar compounds, such as acrylic and methacrylic acid, esters thereof, acrylonitrile (AN) or methacrylonitrile, in the presence of a catalyst system comprising an organometallic halogen compound or an organometallic compound, the latter with the addition of a metal halide and a compound of a transition metal of groups IVa, Va, VIa or VIII of the periodic table containing at least one halogen atom, one alkoxy, β-diketo or acyloxy radical, is known (DE-AS 1,949,370).

According to this publication, a particularly preferred catalyst system contains alkylaluminum halides or alkylboron halides in combination with a vanadium or cobalt compound. The function of these metal compounds is to bind, due to the Lewis acid function, very strongly to the basic centers of the polar monomers, i.e. the ester or nitrile groups of the acrylic monomers, and modifying their structure in such a manner that strictly alternating copolymers are formed. However, this function has the result that these auxiliaries remain bound to the basic centers also after the copolymerization, so that the bonding strength in the finished copolymer is even higher than that in the monomer complex.

This fact is an important disadvantage of alternating copolymerization by complexation, which is inherent in the principle of the process and can as such naturally not be avoided. However, this system-related difficulty weighs particularly heavily if the complexation is carried out using alkylaluminum or alkylboron compounds (or other metal compounds which are sensitive to hydrolysis), because the complexing agent is completely destroyed during the elimination of the complexing agent from the primarily formed copolymer/metal compound complex by solvolysis. This not only leads to the loss of the expensive organometallic compound but also frequently to the formation of products in the hydrolysis (or alcoholysis) which severely impair the workup and isolation in pure form of the copolymer. Just by way of example it may be mentioned that hydrolysis, for example, of $R_XAlCl_{3-X}$, $AlCl_3$, $R_XTiCl_{4-X}$, $TiCl_4$, $R_XSnCl_{4-X}$, $SnCl_4$ leads to the formation of insoluble hydrated oxides, which can be separated off from the copolymer only by multiple reprecipitation, while the hydrogen chloride which is liberated at the same time can cause corrosion and constitutes troublesome waste in any case.

If the application of the complex copolymerization is to be technically feasible and economically efficient, it is absolutely necessary to avoid the complete loss of the complexing agent.

The object of the present invention is to find a process which makes it possible to copolymerize unsaturated polar compounds alternatingly with olefins and to recover the complexing agent from the primarily formed copolymer/metal compound complex in a simple manner and in reusable form.

A further object of the present invention is to provide a process in which the reactants in the individual process steps are largely insensitive to moisture and other impurities of the reaction system.

It has been found that this object can surprisingly be achieved by a process for the preparation of alternating copolymers by free-radical copolymerization of unsaturated polar compounds with olefins in which the copolymerization is carried out in the presence of salts of divalent metals of main and sub-group II of the periodic table as complexing agents. The copolymerization is carried out in organic solvents at pressures of up to 100 bar and at a temperature of $-78°$ C. to $+100°$ C. with the use of free-radical initiators. This copolymerization procedure is substantially less sensitive to water or other impurities of the reaction system than one using organoaluminum compounds.

In this process, the complexed acrylonitrile can be copolymerized alternatingly with olefins in good yield, it being possible for the complexing agent to be easily recovered from the precipitating medium after the copolymerization.

The reaction product comprises a mixture of the copolymer synthesized strictly alternatingly from AN and olefin, and a copolymer which is higher in AN. The alternating copolymer can easily be separated from the mixture by extraction with solvents, such as trichloromethane or acetone.

Methacrylonitrile, vinyl acetate, esters of methacrylic acid and acrylic acid, 2- and 4-vinylpyridine, vinyl ketones, such as methyl vinyl, ethyl vinyl and phenyl vinyl ketone, but preferably acrylonitrile, are used as unsaturated polar compounds.

Suitable olefins are: 1-n-alkenes and 1-iso-alkenes each having 4-6 carbon atoms, dienes, such as butadiene and isoprene, cycloalkenes, such as cyclopentene, styrene and ring-substituted derivatives, α-methylstyrene and substituted derivatives thereof, of which 1-butene, iso-butene and 1-iso-pentenes are preferred, ethylene and propylene are particularly preferred.

Compounds of the metals of main and sub-group II of the periodic table are used as complexing agents, for example nitrates, but preferably halides of the alkaline earth metals, for example magnesium chloride and calcium chloride, but in particular zinc chloride. These halides are strong complexing agents capable of firmly binding 1 or 2 mol of acrylonitrile. Zinc chloride can be used as such or preferably in the form of the complex from zinc chloride and diethyl ether ($Et_2O$). The $ZnCl_2 \times Et_2O$ complex is commercially available.

The metal halides and acrylonitriles form stable complexes which can be isolated and used preferably as such in the copolymerization. Complexes of this type are, for example, $ZnCl_2 \times AN$, $ZnCl_2 \times 2AN$, $ZnCl_2 \times Et_2O$/AN.

The preparation of a $ZnCl_2 \times 2AN$ complex from zinc chloride requires a lengthy process. In contrast, if $ZnCl_2 \times Et_2O$ is used, the reactive complex can be obtained by simply adding AN.

The molar ratio of complexing agent to AN can be 0.5 to 6 mol per mole of AN. To achieve a high degree of alternation, preferably 2 to 6 mol per mole of AN are used in the copolymerization mixture.

The use of the complexing agents results, on the one hand, in a substantial increase in the yield, and, on the other hand, the molar ratio of incorporation of AN/olefin is affected in such a manner that strictly alternating copolymers are formed in the ideal case. In any case, the ratio of incorporation is in the range from 1:1 to 2.5:1, preferably 1:1 to 1.5:1. Thus, it differs significantly from the copolymers obtained without a complexing agent.

The polymerization is in general carried out in an organic solvent, for example aliphatic or aromatic hydrocarbons which may be halogenated, such as chloroform, carbon tetrachloride, 1,1,1-trichloroethane, chlorobenzene, o-dichlorobenzene and toluene. If a homogeneous cause of the reaction is important, the solvent must not be too unpolar. Alkanes are not suitable. Preferred solvents are dichloromethane and 1,2-dichloroethane. The $ZnCl_2 \times 2AN$ complex is particularly soluble in dichloromethane.

In the copolymerization, the molar ratio of olefins (OL) to acrylonitrile (AN) (in free or complex form) in the batch is OL:AN=0.5:1 to 10:1, preferably OL:AN=2:1 to 5:1. If the olefin is styrene, the ratio of OL:AN is 0.5:1 to 1:1.

The copolymerization is carried out at a temperature of $-78°$ C. to $+100°$ C., preferably 30° C. to 80° C. and in particular 40° to 70° C. The pressure in the copolymerization is in general 1 to about 20 bar. If styrene is used, the reaction can be carried out without pressure, but in the case of ethylene a pressure of up to 100 bar can be produced.

The copolymerization is in general carried out in a pressure reactor equipped with a heating and cooling jacket and a stirrer. The initiator and the AN complex dissolved in the solvent used are initially introduced into the pressure vessel at 20° C., and this mixture is, if necessary, then cooled to a temperature which is substantially below the boiling point of the olefin comonomer used. The desired amount of olefin (liquid gas) is then added or condensed into the reactor. The reaction vessel is then sealed and heated to the desired reaction temperature. The reaction time is in general 0.5 to 15 hours, but good results are obtained after as little as 1 to 3 hours.

The components can also be introduced into the reactor in a different order by first introducing the olefin together with the solvent and then adding the solution of the AN complex together with the initiator via a suitable metering device.

The free-radical initiators used for initiating the copolymerization are peresters, for example t-amyl perneodecanoate (TAPND), dialkyl peroxides, for example di-t-butyl peroxide, hydroperoxides, for example t-butyl hydroperoxide. Preferred initiators are dibenzoyl peroxide (BPO) and cyclohexyl peroxycarbonate (CHPC).

At low copolymerization temperatures of $-78°$ C. to 0° C., the polymerization can also be started with $ZnEt_2$ and oxygen (atmospheric oxygen).

Preparation of the $ZnCl_2 \times 2AN$ complex

Zinc chloride is weighed under an inert gas atmosphere and dried under reduced pressure at about 300°–400° C. for about 15 minutes in the melt. After cooling, a 2- to 3-fold excess of AN is added, and the mixture is heated with stirring until all the $ZnCl_2$ has been completely dissolved. Excess AN is removed until an opaque solid has been formed. The composition is determined by weighing, and, if necessary, the evaporation of AN is continued.

$ZnCl_2 \times 2AN$ is a whitish solid which melts between 30 and 35° C. and is readily soluble in $CH_2Cl_2$.

A defined compound $ZnCl_2 \times AN$ can be prepared by removing further AN with more vigorous heating. However, it is completely insoluble in $CH_2Cl_2$ and therefore unsuitable for polymerization in this solvent.

Preparation of the $ZnCl_2 \times Et_2O \times AN$ complex

This ternary complex is prepared in solution by mixing a definite amount of distilled AN with the corresponding amount of a, for example, 2.2 molar solution of the zinc chloride/diethyl ether complex in $CH_2Cl_2$.

Copolymerization

In the examples, the copolymerization is carried out in a pressure reactor equipped with a cooling and heating jacket and designed for about 10 to 15 bar and equipped with a stirrer. Dichloromethane is generally used as the solvent. In the examples where propylene (PR) is used as the olefin comonomer, the pressure reactor is first charged with the initiator (benzoyl peroxide or cyclohexyl peroxycarbonate) and immediately afterwards with $ZnCl_2$ and the solvent or with one of the complex solutions described above. The contents of the reaction vessel are then cooled to $-80°$ C. under an inert gas. At the same time, the amount of propylene necessary for the particular batch of the reaction is condensed and transferred at about $-50°$ C. to the already cold reactor in the absence of pressure. After about 30 minutes, a water thermostat is connected to the reactor, and the reactor is slowly heated to the final temperature with vigorous stirring of the reaction mixture (about 2000 rpm). As soon as the maximum pressure has been reached, the reaction is regarded as having started.

In the examples where ethylene (ET) is used as the olefin comonomer, the preliminary procedure and the addition of complex and the subsequent cooling of the autoclave are carried out as described in the propylene examples. The required amount of ET (b.p. 760:103.9° C., density at $-145°$ C.=0.6246 g/ml) is first condensed into a volumetric vessel which is cooled by means of liquid nitrogen, and is then transferred to the reactor. After a waiting time of about 30 minutes, the mixture is heated as described in the propylene examples.

Workup of the reaction products

After the desired reaction time, the thermostat is turned off, the reaction mixture is cooled to about 20° C., and the reaction apparatus is let down. In the case of AN/ET batches, ⅓ of the total volume of methanol is added to the reaction mixture, while in the case of AN/PR batches the same volume of acetone is again added to dissolve the precipitated complex AN/PR copolymer again. The insoluble AN/ET copolymer is freed of excess "solvent" and washed with methanol; the copolymer is then dissolved or swollen in dimethylacetamide and precipitated in cold methanol ($-78°$ C.). This "reprecipitation" is carried out twice.

The reaction solution containing the AN/R copolymer is completely freed of the solvent (dichloromethane/methanol/acetone) under suitable conditions, the residue is taken up in pure acetone, and the copolymer is precipitated by pouring it into cold methanol ($-78°$ C.); for further purification, the preparation is again reprecipitated. All reprecipitated polymers are dried in a drying cabinet at 50° C. for at least 25 hours under reduced pressure.

The process according to the invention enables olefins which by themselves cannot be polymerized by free-radicals to be copolymerized. The process can be controlled in such a manner that only strictly alternating copolymers are formed in the ideal case. This makes it possible to produce copolymers having a high degree of order and differing in their properties, such as crystallinity, glass-transition temperature, melting behavior and density from random copolymers. They are therefore valuable components for manufacturing novel materials.

EXAMPLES

In Table 1 below, the amounts used in Examples 1 to 12 including Comparative Examples 9 and 10 in the copolymerization of olefins and acrylonitrile have been listed. The symbols have the following meanings:

| Solution volume | = | Amount used |
|---|---|---|
| $(AN)_o$ | = | Mol of acrylonitrile/liter of solution volume |
| AN | = | Acrylonitrile |
| OL | = | Olefin |
| ET | = | Ethylene |
| PR | = | Propylene |
| CHPC | = | Cyclohexyl peroxycarbonate (initiator) |
| DMA | = | Dimethylacetamide |
| DMF | = | Dimethylformamide |
| DMSO | = | Dimethyl sulfoxide |

The reaction time in these examples was 15 hours, and the reaction temperature 40° C.

TABLE 1

| Ex. | Olefin Type | Olefin Amount ml | AN g | AN mol | Complexing agent Type | Complexing agent Amount Mol | CHPC mg | CHPC mmol | $CH_2Cl_2$ ml | Solution volume ml | $(AN)_o$ mol/l | Ratio (compl. AG.):(AN) | Ratio (OL):(AN) |
|---|---|---|---|---|---|---|---|---|---|---|---|---|---|
| 1 | PR | 59.3 | 0.881 | 9.35 0.1762 | $ZnCl_2$ | 11.7** 0.0858 | 504 | 1.762 | 80 | 150 | 1.2 | 0.5 | 5 |
| 2 | PR | 60.6 | 0.9 | 9.55 0.18 | $ZnCl_2.Et_2O$* | 81.8 0.18 | 515 | 1.8 | — | 150 | 1.2 | 1 | 5 |
| 3 | PR | | | AS EX. 2 | | | | | | | | 2 | |
| 4 | PR | 25.2 | 0.375 | 3.98 0.075 | $ZnCl_2.Et_2O$ | 136 0.3 | 215 | 0.75 | — | 150 | 0.5 | 4 | 5 |
| 5 | ET | 36.4 | 0.818 | 17.8 0.27 | $ZnCl_2.Et_2O$ | 61.4 0.135 | 773 | 2.7 | 30 | 150 | 1.8 | 0.5 | 3 |
| 6 | ET | 24.2 | 0.54 | 9.55 0.18 | $ZnCl_2.Et_2O$ | 81.8 0.18 | 515 | 1.8 | 32 | 150 | 1.2 | 1 | 3 |
| 7 | ET | 10.1 | 0.225 | 3.98 0.075 | $ZnCl_2.Et_2O$ | 136 0.3 | 215 | 0.75 | — | 150 | 0.5 | 4 | 3 |
| 8 | ET | 6 | 0.135 | 2.39 0.045 | $ZnCl_2.Et_2O$ | 123 0.27 | 129 | 0.45 | 18 | 150 | 0.3 | 6 | 3 |
| 9C | PR | 47 | 0.7 | 7.24 0.14 | — | — — | 400 | 1.4 | 54 | 110 | 1.24 | — | 5 |
| 10C | ET | 12.1 | 0.27 | 4.78 0.09 | — | — — | 257 | 0.9 | 81 | 100 | 0.9 | — | — |
| 11*** | PR | 54.1 | 0.81 | 8.53 0.161 | $ZnCl_2.Et_2O$ | 73.2 0.161 | 460 | 1.61 | — | 135 | 1.2 | 1 | 5 |
| 12*** | PR | 42.1 | 0.625 | 6.63 0.125 | $ZnCl_2.Et_2O$ | 56.8 0.125 | 357 | 1.25 | — | 104 | 1.2 | 1 | 5 |

*Solution 2.2 molar, amount in ml in $CH_2Cl_2$
**in g
***including recovered complexing agent

| | Characterization of the copolymers obtained according to Examples 1 to 9: | | | | | |
|---|---|---|---|---|---|---|
| Ex. | a) Conversion (%) | b) $M_w$ | b) $M_n$ | c) Tg/K | Soluble in | d) Ratio of incorporation of AN/olefin d) |
| 1 | 31.6 | 110,000 | 20,000 | 328 | Acetone, DMA DMF, DMSO | 1.5:1 |
| 2 | 67.0 | 55,700 | 9,500 | 322 | Acetone, DMA DMF | 1.4:1 |
| 3 | 80.0 | 252,000 | 41,700 | 330 | Acetone, DMA DMF | 1.2:1 |
| 4 | 76.8 | 161,000 | 40,000 | 327 | Acetone, $CH_2Cl_2$ DMF, DMA | 1.1:1 |
| 5 | 49.8 | 40,600 | 22,000 | 329 | DMA, DMF, DMSO | 2.4:1 |
| 6 | 52.8 | 279,000 | 26,300 | 331 | DMA, DMF, DMSO | 1.8:1 |
| 7 | 36.2 | 94,000 | 11,200 | 315 | DMA, DMF, DMSO almost completely in acetone | 1.2:1 e) |
| 8 | 10.1 | 44,500 | 4,100 | 331 | DMA, DMF, DMSO almost completely in acetone | 1.4:1 e) |
| 9C | 4.5 | 16,000 | 7,800 | 324 | DMA, DMF, $CHCl_3$ almost completely | 1.9:1 |
| 10C | 3.0 | — | — | — | DMA, DMSO | 20:1 |
| 11 | 20.0 | 44,300 | 22,800 | 323 | Acetone, DMA, DMF | 1.4:1 |
| 12 | 49.6 | 38,300 | 20,000 | 324 | Acetone, DMA | 1.4:1 |

| | -continued | | | | |
|---|---|---|---|---|---|
| | Characterization of the copolymers obtained according to Examples 1 to 9: | | | | |
| Ex. | a) Conversion (%) | b) $M_W$ | b) $M_n$ | c) $T_g$/K Soluble in | d) Ratio of incorporation of AN/olefin d) |
| | | | | DMF | | a) Relative to $(AN)_o$
b) By GPC in DMA at 70° C.; Styragel column set; polystyrene standard; errors of $M_n$ values very high, due to difficulty in base line correction.
c) DSC, 2nd heating cycle, 20K/min
d) $^1$H-NMR analysis
e) Bimodal The AN/PR copolymers of Examples 2 and 3 comprise up to 50% of $CHCl_3$-soluble portions. After extraction with $CHCl_3$ for 15 hours, 43.2% by weight of extractable, $CHCl_3$-soluble portion having the following characteristic data was obtained:

$M_2 = 11,000$  $M_n = 4,400$;
$T_g = 325K$ (Extraction residue: $T_g = 332K$)
Ratio of incorporation (by $^1$H-NMR): AN/PR = 1:1
(Extraction residue: 1.7:1)

According to $^{13}$C-NMR analysis, the extractable portion is composed of 100% of alternating copolymers.

Example 13

| Copolymerization of AN and PR using $ZnCl_2 \times Et_2O$ as complexing agent | |
|---|---|
| Solution volume: | 150 ml |
| $(AN)_o$ | 0.3 mol/l |
| $ZnCl_2 \times Et_2O$ | 123 ml of 2.2M $CH_2Cl_2$ solution = 0.27 mol |
| AN: | 2.96 ml = 0.045 mol |
| PR: | 15.2 ml = 0.225 mol |
| CHPC: | 129 mg = 0.45 mmol |
| $(ZnCl_2 \times Et_2O):(AN)$ | = 6; (PR):(AN) = 5; T = 40° C.; |
| reaction time: | 15 h. |

After the reaction time, the mixture was cooled to about 20° C. and the apparatus was let down. First 100 ml of acetone were added via the tube with gentle stirring and then methanol (about 50–60 ml) until the mixture had become homogeneous. The solution was transferred into a 1 l flask, the pressure vessel was rinsed twice with acetone, and the combined solutions were concentrated. The yellowish transparent viscous residue was taken up in about a 10-fold amount of acetone, filtered under a slight positive pressure and immediately afterwards added dropwise to 1.5 l of cold (−78° C.) vigorously stirred methanol. The precipitated white copolymer was filtered off with suction, washed once each with cold methanol and diethyl ether and then dried in a drying cabinet at 50° C. under reduced pressure; for further purification, the dry polymer was dissolved in a 10-fold amount of acetone and the reprecipitation was carried out as described above. Yield: 2.10 g=49.1%, relative to AN; the product is completely soluble in $CHCl_3$.

$M_w = 78,500$, $M_n = 26,000$; bimodal.
$T_g = 326$ K.
Ratio of incorporation: AN/PR=1:1.

To recover and determine the $ZnCl_2$ quantitatively in the methanolic filtrate the procedure, after the polymer had been separated off, was as follows: filtrate and wash solutions of the first precipitation were concentrated together, the remaining viscous brownish mass was transferred to a porcelain dish and then completely evaporated to dryness. The residue was then carefully heated at 300°–400° C. for another 15 minutes to decompose organic components. The weight of the melt cake was 37.8 g; since the $ZnCl_3 \times Et_2O/CH_2Cl_2$ solution used was 2.2 molar, the reaction mixture contained 36.78 g of $ZnCl_2$, i.e. the recovery is virtually complete. After cooling, the melt cake was leached with about 200 ml of hot water, the aqueous solution was filtered, and the clear slightly yellowish filtrate was made up to 1 liter with distilled water (T=20° C.).

To determine $Zn^{2+}$ quantitatively, two 10 ml samples were removed from the mixture, diluted with 50 ml each of distilled water, and made alkaline with 10 ml each of ammonia solution (25% strength). $Zn^{2+}$ was titrated with a 0.1M EDTA solution at the boiling temperature, using Merck indicator buffer tablets; the crucial color change is that of dirty red to green.

The consumption of 0.1M EDTA solution (f=1.0208) was 26.8 ml and 26.9 ml, which at an average value of 26.85 ml corresponds to $ZnCl_2$ concentration in the sampled solution of 0.3735 g. Accordingly, 37.35 g of $ZnCl_2$ were dissolved in one liter of the solution, which corresponds to 98.8% of the weight of the melt cake.

Only 5.2 mg of $ZnCl_2$ were detected in filtrate of the reprecipitation.

The recovered $ZnCl_2$ was used as the ether complex for Examples 11 and 12.

Example 14

| Copolymerization of AN and PR using $ZnCl_2$ as complexing agent | |
|---|---|
| Solution: | 130 ml |
| $(AN)_o$: | 1.3 mol/l |
| $ZnCl_2$: | 11.61 g = 0.0852 mol |
| PR: | 57.3 ml = 0.855 mol |
| AN: | 9.07 g = 0.1709 mol |
| BPO: | 414 mg = 1.709 mmol |
| $CH_2Cl_2$: | 60 ml |
| $(ZnCl_2):(AN)$ | = 0.5; (PR):(AN) = 5; T = 60° C.; |
| reaction time: | 14 h |

After a reaction time of 14 hours, the mixture was cooled to about 20° C. and the apparatus was let down. About 50 ml of methanol were added through the tube for solvolysis of the complexed polymer, and by further addition of a small amount (20–30 ml) of acetone a homogeneous solution was obtained. The contents of the reaction vessel were then transferred into a 500 ml flask and concentrated. The highly viscous, yellowish transparent residue was taken up in a 10-fold amount of acetone, the solution was filtered under pressure and from there directly added dropwise to 1.5 l of cold (−78° C.) vigorously stirred methanol. The precipitated copolymer (white product) was filtered off with suction, washed once each with cold methanol and diethyl ether and then dried. For further purification, it was dissolved in a 10-fold amount of acetone and precipitated in methanol as described above.

Yield: 3.16 g = 19.4%, relative to AN.
$M_w$ = 225,000, $M_n$ = 16,000, bimodal.
$T_g$ = 340 K.
Ratio of incorporation: AN/PR = 1.5:1

The filtrate of the first precipitation and the wash solution were used for the $ZnCl_2$ recovery. The solvent was removed by evaporation, and the water was carefully driven off the syrup-like colorless residue. This gave a whitish material which, however, rapidly changed to a brown color, if organic impurities were present. Finally, heating at 300°–400° C. for 15 minutes removed the water completely and gave 12.2 g of a melt cake predominantly composed of $ZnCl_2$.

This melt cake was taken up in about 200 ml of hot water, the solution was freed of insoluble components by filtration, and the clear filtrate was made up to 1 l with distilled water (T = 20° C.).

For the purpose of quantitative analysis, samples of 20 ml each were removed, made alkaline with 20 ml of 5% strength ammonia solution, and titrated in the heat with 0.1M EDTA solution. If Merck indicator tablets are used, the crucial color change is that of dirty red to green.

The consumption of 0.1M EDTA solution (f = 0.9995) was 14.5 ml and 14.55 ml, which at an average value of 14.525 ml corresponds to a concentration of 94.9 mg of $Zn^{2+}$ in the sample solution (20 ml). Accordingly, a total of 9.89 g of $ZnCl_2$ were present in 1 l of solution, which corresponds to 85.2% of the $ZnCl_2$ used as the diethyl ether complex (81.1% of the weight of the melt cake).

We claim:

1. A process for the preparation of an alternating copolymer by free-radical copolymerization of an unsaturated polar compound with an olefin, diolefin or cycloolefin, which comprises carrying out the copolymerization in the presence of zinc chloride in the form of its complexes $ZnCl_2 \times Et_2O$ or $ZnCl_2 \times Et_2O \times$ acrylonitrile or in a mixture thereof as a complexing agent and in the presence of an organic solvent.

2. The process as claimed in claim 1, wherein the unsaturated polar compound is acrylonitrile (AN) in a molar ratio of complexing agent (CA) to (AN) of from 0.5:1 to 6:1.

3. The process as claimed in claim 1, wherein the olefin is an α-olefin.

4. The process as claimed in claim 3, wherein the α-olefin is ethylene, propylene, 1-butene, iso-butene or 1-iso-pentene.

5. The process as claimed in claim 1, wherein the organic solvent is dichloromethane.

6. The process as claimed in claim 1, wherein the complexing agent is used in recovered form.

7. The process as claimed in claim 2, wherein the molar ratio of incorporation of AN to olefin is in the range of 1:1 to 2.5:1.

8. The process as claimed in claim 2, wherein the molar ratio of olefin (OL) to acrylonitrile (AN) is OL:AN-0.5:1 to 10:1 and the molar ratio of complexing agent (CA) to acrylonitrile (AN) is

CA:AN = 2:1 to 6:1.

9. The process as claimed in claim 1, wherein the copolymerization is carried out at a temperature of −78° C. to +100° C.

10. The process as claimed in claim 1, wherein the copolymerization is carried out further in the presence of a free-radical polymerization initiator.

11. The process as claimed in claim 10, wherein the initiator is a perester, dialkyl peroxide, hydroperoxide or oxygen.

12. The process as claimed in claim 11, wherein the initiator is cyclohexyl peroxycarbonate.

* * * * *